United States Patent [19]

Kolb

[11] 4,344,516

[45] Aug. 17, 1982

[54] DISENGAGING DEVICE

[75] Inventor: Dieter Kolb, Bad Kissingen, Fed. Rep. of Germany

[73] Assignee: Fichtel & Sachs AG, Schweinfurt, Fed. Rep. of Germany

[21] Appl. No.: 139,586

[22] Filed: Apr. 11, 1980

[30] Foreign Application Priority Data

Apr. 20, 1979 [DE] Fed. Rep. of Germany ....... 2915989

[51] Int. Cl.³ ...................... F15B 21/00; F16B 21/14; F16B 21/16
[52] U.S. Cl. ................................. 192/114 R; 92/171; 403/316; 403/328; 403/379
[58] Field of Search ................. 403/DIG. 7, 328, 326, 403/316, 379, 155; 192/85 CA, 110 S, 115, 70.13; 411/517, 518, 353; 92/171

[56] References Cited

U.S. PATENT DOCUMENTS

| | | | |
|---|---|---|---|
| 1,048,804 | 12/1912 | Bristol | 403/328 X |
| 2,220,610 | 11/1940 | Miller | 403/328 X |
| 2,304,038 | 12/1942 | Thompson | 287/DIG. 7 |
| 2,461,699 | 2/1949 | Schweiwer | 403/316 X |
| 2,484,401 | 10/1949 | Coie | 403/379 X |
| 3,131,796 | 5/1964 | Youngs | 192/85 CA |
| 3,157,257 | 11/1964 | Root | 192/85 CA X |
| 3,342,273 | 9/1967 | Crane | 403/379 X |
| 3,631,688 | 1/1972 | Quick | 403/316 X |
| 3,907,085 | 9/1975 | Rist | 192/85 CA X |
| 4,192,220 | 3/1980 | Tateoka | 403/326 X |

FOREIGN PATENT DOCUMENTS

1515756 6/1978 United Kingdom .
1536367 12/1978 United Kingdom .

*Primary Examiner*—Rodney H. Bonck
*Attorney, Agent, or Firm*—Toren, McGeady & Stanger

[57] ABSTRACT

A disengaging device is used with a frictional clutch which includes a rotating member displaceable in the direction of its axis of rotation. The disengaging device provides a releasable locking connection between the rotating member and a gear case, and includes a first part and a second part each coaxial with the axis of rotation and with the second part laterally enclosing the first part. At least one opening extends through the outer second part and is located opposite a groove or recess in the inner part. A locking member is passed through the opening into locking engagement with the groove or recess in the first part for preventing relative axial displacement between the two parts. The locking member can be removed for separating the two parts.

5 Claims, 11 Drawing Figures

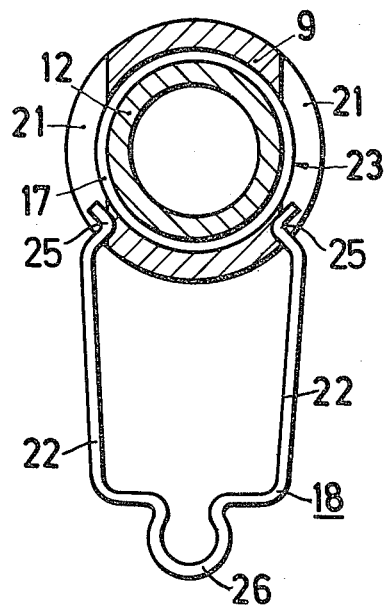
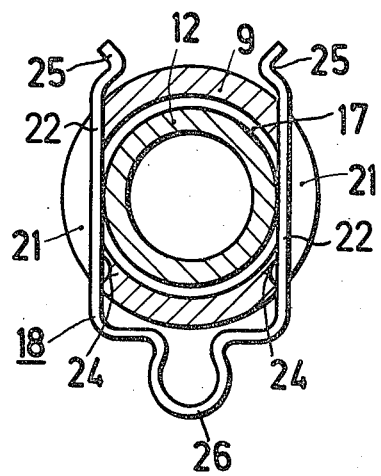
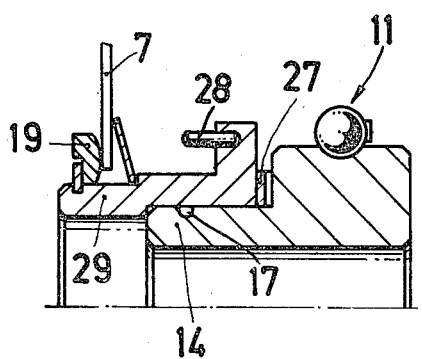
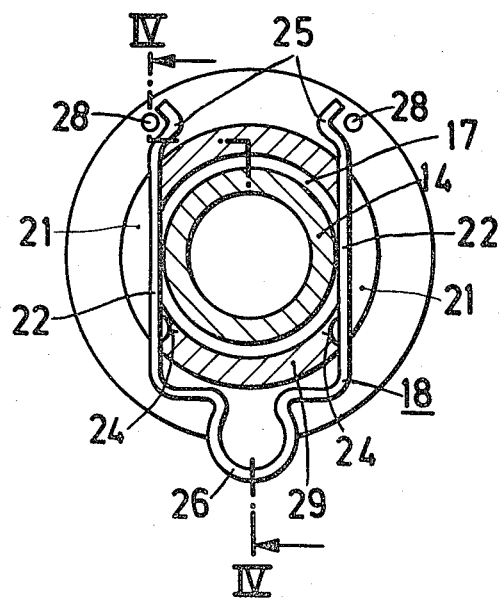

DISENGAGING DEVICE

SUMMARY OF THE INVENTION

The present invention is directed to a disengaging device used with a frictional clutch which includes a rotating member which can be displaced in the direction of its axis of rotation. The disengaging device affords a releasable locking connection between the frictional clutch and a gear case.

From West German Offenlegungsschrift No. 2 613 952 it has been known to use a force-locking snap connection when assembling the motor and a gear case for the transmission of disengaging forces. Such a connection has the disadvantage that during disassembly of the motor and the gear case a relatively high force must be used which is considerably higher than the disengaging force for the clutch, and which presents difficulties when one of the two units being disassembled is still installed in the vehicle.

Therefore, it is the primary object of the present invention to provide a locking device for a vehicle clutch which can be easily locked or released during assembly or disassembly of the motor and the gear case. Further, with such a device it is possible to utilize a clutch housing constructed as a unit with the gear case.

In accordance with the present invention the disengaging device includes two parts coaxial with one another and located between the gear case and the disengaging rotating member of the clutch. The device can be locked or released from the exterior, that is, through an assembly opening in the gear housing. The locking device secures the two parts together against relative axial movement in a positive manner. Due to this positive locking connection, a suitable transmission of the disengaging force between the gear case and the clutch is assured. Placement of the locking device, for instance through an assembly opening in the gear housing, is the simplest and safest method for effecting the connection.

In one embodiment, the locking connection between two coaxially arranged parts is provided between a rotating roller bearing ring and the disengaging axially displaceable part of the clutch. Such an arrangement has the advantage that the disengaging device can be positioned ready for use before the assembly of the motor and the gear case so that, after the assembly has been effected, it is merely necessary to complete the connection between the rotating roller bearing ring and the axially displaceable part of the clutch.

In another embodiment of the invention the locking connection can be provided between two coaxially arranged parts where one is the non-rotating roller bearing ring and the other is a guide member on the gear case. In such an arrangement, which is particularly advantageous where hydraulic clutch actuation is used, the device can be arranged on the axially movable part of the clutch, the diaphragm spring tongues or the disengaging levers, so that after assembly of the motor and the gear case, the locking connection can be easily effected.

In still another embodiment of the present invention the locking connection of the two coaxial parts can be effected by a clamp fixed in the outer part with the clamp seated within a groove formed in the inner part. Basically the clamp is formed of two legs extending approximately parallel with one another with the legs connected together at one end and being fixed on the outer part in a releasable manner by a positive or frictional connection. Such a clamp is easy to manufacture and its ability to be secured on the outer part of the two coaxial parts in the released condition of the parts enables a very simple assembly of the motor and gear case, because after assembly it is only necessary to shift the clamp from its preassembly position into the locking position. The locked position of the clamp is effected in the area of the free ends of its legs.

It is also possible, however, to provide the fixed position of the clamp in the part which connects its two legs. In one arrangement for interlocking the two coaxial parts, the outer part is provided with an opening on two opposite sides with the openings extending transversely of the axis of the part. The space between the openings corresponds to the depth of the groove formed in the inner part. The openings extend completely through a portion of the outer part affording a break-through in its inner surface. At the entrance ends of the openings, indentations are provided in which the free ends of the legs of the clamp can be held in the released or preassembly position. Curved portions at the free ends of the legs fit into the indentations. In the locked position these curved ends extend from the openings and rest against the outside surface of the outer part. Accordingly, preassembly of the clamp on the outer part is possible and it can be displaced into the locking position by merely moving it through the openings in the outer part. Accordingly, the relative position of the two coaxial parts in the circumferential direction, is unimportant. In this arrangement the curved portions at the free ends of the legs of the clamp not only serve to fix the clamp in the released or preassembly position during assembly or disassembly, but they also serve to secure the clamp in the locked position by appropriately encircling the outside surface of the outer part after they are completely moved through the openings passing through the break-throughs.

It is also possible to fix the clamp in the locked position by providing a web projecting outwardly from the outer part with a groove formed in the web in alignment with the openings or bores through the outer part. When inserted into the locked position, the part of the clamp interconnecting the ends of the legs engages in the groove formed in the web thereby locking it in place.

If the two parts to be connected together are also subjected to rotational movement during the rotation of the clutch, it is particularly advantageous to arrange the legs of the clamp so that they are free of centrifugal force. Freedom from centrifugal force can be provided by guiding the legs in appropriate bores or by forming hooks on the free ends of the legs which engage pins or the like. In another possible interlocking arrangement for the two coaxial parts, several cylindrically shaped locking elements are spaced apart in the circumferential direction of the outer part. These locking elements are guided in radial bores in the outer part and engage in a groove or bores formed in the inner part. For securing these locking elements in place an open clamp or a rigid ring can be used which can be placed over and around the locking elements for biasing them into engagement with the inner part. In a practical arrangement, each of the locking elements is spring-biased in the unlocking direction so that, when the member displacing them in the locked position is removed, the locking elements are automatically biased into the unlocked position.

The member for securing the locking elements in position can be rotated in the circumferential direction of the outer part instead of being shifted in its axial direction. Such a member has circumferentially spaced projecting parts which correspond to the unlocked positions of the locking elements. By turning the member around the outer part the locking elements can be displaced into either the locked or unlocked positions.

In a particularly advantageous arrangement, the locking elements are rigidly connected with an annular shaped open spring band which is prestressed in the locking direction. In such an arrangement, all of the locking elements are combined with the spring band into a single unit.

With an appropriate design of the outer part, it is possible in a simple manner to lock the open spring band which has two of the locking elements facing the open end of the band in a preassembly position so that the locking action is made as simple as possible.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIGS. 2 and 3 are cross-sectional views illustrating a spring clamp of the present invention in the unlocked or preassembly position and the locked position, respectively;

FIG. 4 is a partial axially extending sectional view of an embodiment of the present invention illustrating a rotating clamp having legs free of centrifugal force;

FIG. 5 is a transverse sectional view of the arrangement shown in FIG. 4;

DETAIL DESCRIPTION OF THE INVENTION

Figure 1:
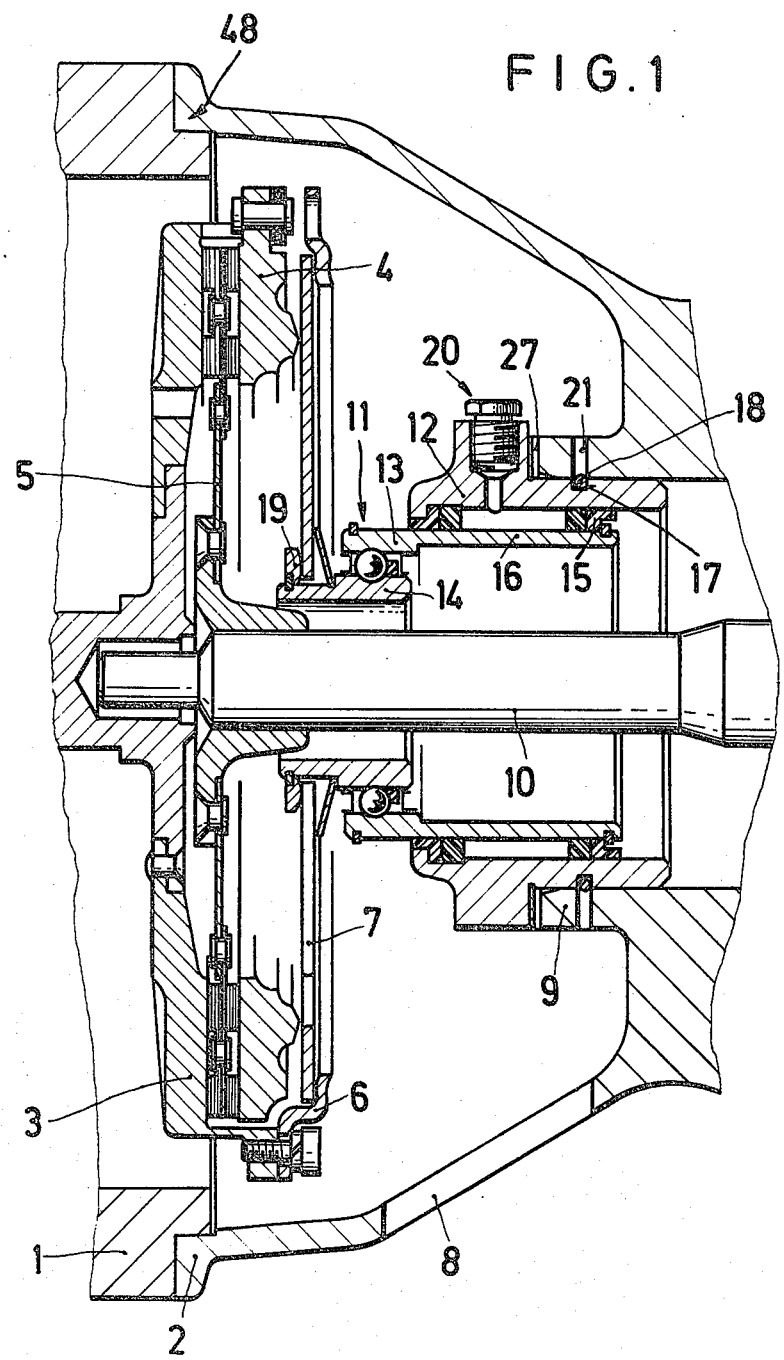
FIG. 1 is a longitudinal sectional view through a clutch including a disengaging device and also illustrating adjacent parts of the gear housing and the motor housing.

In FIG. 1 a clutch with hydraulically actuated disengaging system is shown in section, positioned within a gear housing 2. At one end, the gear housing is flanged onto a motor housing. The clutch includes a flywheel 3 secured to a crankshaft, not shown, a clutch housing 6, a clutch disk 5 between the housing and the flywheel. The clutch disk is connected to a power take-off shaft so that there is no relative rotation therebetween, and a diaphragm spring 7 biases a contact plate 4 toward the flywheel 3 for clamping the clutch disk 5. The diaphragm spring 7 is supported at its outer periphery on the clutch housing 6 and adjacent its radially inner periphery inwardly of the contact plate 4. For lifting the clutch, the tongues of the diaphragm spring must be moved away from the clutch. For this disengaging action, a roller bearing 11 is used consisting of a rotating ring bearing 14 which engages the diaphragm spring tongues via an abutment 19. In addition the roller bearing 11 includes a non-rotating ring bearing 13 which is connected to the rotating ring bearing 14 by appropriate rollers. The ring bearing 13 has a cylindrical extension 16 extending away from the clutch toward the gear case. The cylindrical extension 16 together with a hydraulic piston 15 and a hydraulic cylinder 12 effect the disengaging movement of the clutch in the axial direction. The hydraulic cylinder is provided with a hydraulic connection 20 which is located on the exterior of the hydraulic cylinder for connection to a flexible line. The hydraulic connection can be activated by a clutch lever in the motor vehicle. The hydraulic cylinder has a cylindrically shaped outer surface facing the gear case which is coaxially inserted into a guide sleeve 9 on the gear case and is fixed to it by a clamp 18 so that there is no relative axial movement between the two parts. This clamp 18, as described in FIGS. 2 and 3, is guided through appropriate openings 21 in the guide sleeve and fits into an annular groove 17 in the outer surface of the portion of the hydraulic cylinder 12 fitted into the guide sleeve. In addition, a corrugated spring 27 is positioned between the outer end of the guide sleeve 9 and a shoulder on the hydraulic cylinder 12 to compensate for any play therebetween.

Before assembling the motor and the gear case together, the parts of the disengaging device are preassembled on the clutch. Therefore, the roller bearing 11 which forms a single unit with the extension 16 and the hydraulic actuation parts, is connected to the diaphragm spring 7 via the rotating ring bearing 14 and the abutment 19 which encircles the diaphragm spring. In addition, the clamp 18, as discussed below, is arranged in the unlocked position on the guide sleeve 9 of the gear case. The motor and the gear case are assembled by sliding the guide sleeve 9 over the outer surface of the hydraulic cylinder 12 and the motor housing 1 and the gear housing 2 are mutually aligned by means of a collar 48. After bolting the motor and gear housings together, the clamp 18 is moved from its fixed unlocked position into the opening 21 in the guide sleeve 9 so that it passes into the groove 17 in the hydraulic cylinder 12 and provides a locked connection between the guide sleeve 9 on the gear case and the disengaging system in the form of the hydraulic cylinder 12. The clamp 18 locks the two parts together against relative axial movement. Access to the clamp is assured by an assembly opening 8 located in the gear housing 2. Disassembly of the clutch and the gear case takes place in the reverse sequence to that described above.

In FIGS. 2 and 3 a basic embodiment of clamp 18 is illustrated with the two parts connected by the clamp being shown in section. One part is the guide sleeve 9 and the other part is the hydraulic cylinder 12. As shown in FIG. 1 the hydraulic cylinder 12 is the inner part circumferentially enclosed by the guide sleeve 9 forming the outer part. The inner surface of the guide sleeve 9 is in contact with the outer surface of the hydraulic cylinder 12. In FIG. 2 the clamp 18 is shown in the unlocked or preassembly position while in FIG. 3 the clamp is shown displaced into the locked position. A pair of openings 21 are formed in the guide sleeve 9 each located on a diagonally opposite side of the hydraulic cylinder 12. The base of the openings extend generally parallel with one another and chordally of the guide sleeve. The spacing between the bases of the openings is approximately equal to or slightly wider than the spacing between the legs of the clamp 18. An annular circumferentially extending groove 17 is formed in the outer surface of the hydraulic cylinder 12 and the space between the bases of the openings 21 is equal to the diameter of the base of the groove 17. Since the spacing between the bases of of the openings 21 is the same as the diameter of the base of the groove 17, a portion of the openings form break-throughs 23 through the inner surface of the guide sleeve 9. When positioned for assembly, the break-throughs 23 in the openings are aligned opposite the groove 17 in the hydraulic cylinder. In preparation for assembling the two parts, the clamp with the curved portions 25 on each of the free ends of its legs 22 are hooked into a corresponding notch 24 formed in the openings 21 and spaced from the break-throughs 23. In other words, the clamp 18 is held in the notches 24 during the assembly operation. After the motor housing and gear housing have been assembled together, at the connection point 26 in the bight portion extending between the legs, a pushing force is applied displacing the curved portions 25 of the springs 18 out of the notches 24 and displacing the clamp through the openings 21 until the curved portions engage the outside surface of the guide sleeve on the opposite side from the notches 24. As shown in FIG. 3, with the clamp 18 pushed through the openings 21 the clamp is held within the openings 21 and the groove 17 for locking the two parts against relative axial movement.

In FIGS. 4 and 5, another arrangement of the locking device is shown where the locking connection is provided between the rotating roller bearing ring 14 of the roller bearing 11 and the ring 29 on which the diaphragm spring 7 is secured. The roller bearing 11 is connected via its non-rotating ring bearing 13 with the disengaging system in a manner not shown. The rotating ring bearing 14 has an outside diameter corresponding to the inside diameter of the ring 29 within which it is guided. The bearing ring 14 and the ring 29 are coaxial. In FIG. 5, it can be noted that the rotating ring bearing 14 has a groove 17 similar to that shown in FIGS. 2 and 3 while the ring 29 has a pair of openings 21 also similar to the other embodiment. Two notches 24 are provided in the ring 29 in which the curved portions 25 of the clamp 18 can be secured during assembly or disassembly. The curved portions 25 are located at the free ends of each leg 22 of the clamp 18. Ring 29 is rigidly connected via the abutment 19 with the diaphragm spring 7, while the roller bearing 11 is connected to the gear housing by a corresponding disengaging device. Since the ring 29 and the ring bearing 14 both rotate during operation, the legs 22 of the clamp 18 are free of centrifugal force due to the arrangement of a pair of pegs 28 extending parallel to the axis of rotation of the clutch. The pegs 28 are secured to the opposite end of the ring 29 from the diaphragm spring 7 and the pegs project over the openings 21 in the ring 29. During assembly or disassembly of such an embodiment, care must be taken that the position of the ring 29 is arranged in such a manner that the connecting bight portion 26 of the clamp 18 can be reached through an assembly opening in the gear housing and can be pushed inwardly or pulled outwardly through the opening for effecting the locking engagement or release of the locking engagement, respectively.

Figure 6:
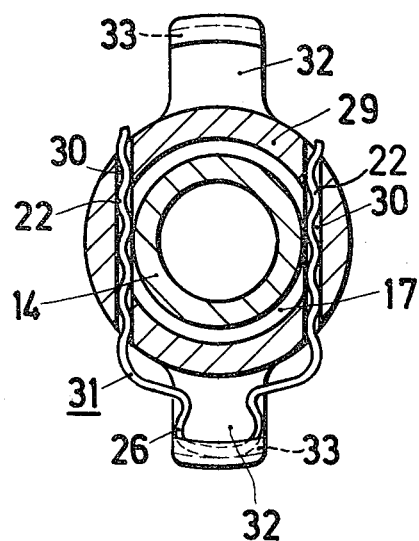
FIG. 6 is a transverse sectional view of another embodiment of a rotating clamp having its legs free from centrifugal force.
Figure 7:
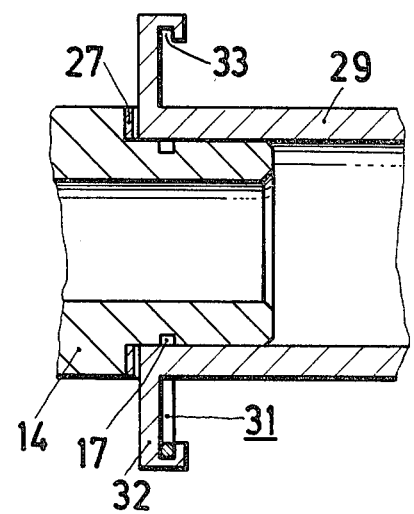
FIG. 7 is an axially extending view of the arrangement shown in FIG. 6.

In FIGS. 6 and 7 an additional embodiment of the locking device is displayed. This embodiment is also directed to the connection of two concentric and rotating parts which can be located at any position between the disengaging bearing and the disengaging parts of the clutch. In this embodiment, the inner part is the rotating ring bearing 14 containing the groove 17, while the outer part is the ring 29 which, instead of a pair of openings, has a pair of parallel bores 30 extending chordally through the ring. The legs 22 of spring clamp 31 extend through the bores 30 in the locked position of the two parts. Due to the position of the two bores 30, comparable to the arrangement of the openings 21 in the other embodiments, the spring clamp 31 is maintained free of centrifugal force, since its legs 22 extend through and are held within the bores 30 and also within the groove 17 at the portions of the bores which form break-throughs through the inside surface of the ring 29. On diagonally opposite sides of the ring 29 located between the ends of the bores 30, webs 32 are provided each with a groove in the end of the web spaced outwardly from the ring, note FIG. 7. When the clamp 30 is inserted into the locked position, the bight portion 26 of the clamp is secured within the groove 33 in the web 32. Further, a corrugated spring 27 is positioned between a shoulder on the ring bearing 14 and another shoulder formed on the end of the ring 29 from which the web extends outwardly. The corrugated spring 27 compensates for any play between these two parts.

Figure 8:
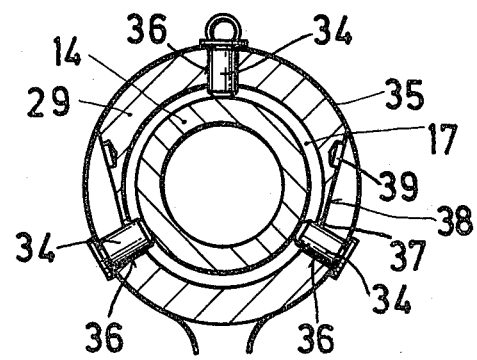
FIG. 8 is a transverse sectional view of another embodiment of the present invention showing a spring band open on one side with pins riveted on the band for providing the locking action.

In still another embodiment exhibited in FIG. 8, the two coaxial parts are the rotating ring bearing 14 forming the inner part and the ring 29 forming the outer part. A groove 17 is formed in the outside circumferential surface of the rotating bearing 14. The openings in the ring 29 are different from the previous embodiments and are in the form of three radially extending bores 36 extending between the outside and inside surfaces of the ring 29. The three bores are equiangularly spaced apart around the ring 29. A corresponding pin 34 is inserted into each of the bores 36 and the pins are interconnected by a spring band 35 which extends around the outside surface of the ring 29. For easier assembly and disassembly, the spring band 35 is open on one side, note the lower side in FIG. 8, so that it does not form a complete circle. The two bores 36 in the ring 29 located closer to the opening in the spring band 35 have a shorter side on the side closer to the third pin 34 located between the other two pins. The shortened side wall 37 of the bores 36 is provided by a cutaway part in the outside surface of the ring 29. Due to the cutaway portion a base surface 38 extends approximately perpendicularly from the outer end of the shortened side wall 37 in the direction away from the opening in the spring band 35. Each of the base surfaces 38 has a stop recess 39 spaced from the shortened side wall. The stop recesses 39 are arranged so that the pins 34 in the adjacent bores 36 can be held in these stop recesses during the assembly or disassembly of the motor and the gear case. If these stop recesses are designed appropriately, then the spring band 35 with its pins 34 can be easily pushed or displaced from the unlocked position into the locked position, as shown in FIG. 8, after the assembly of the two parts has been completed.

Figure 9:
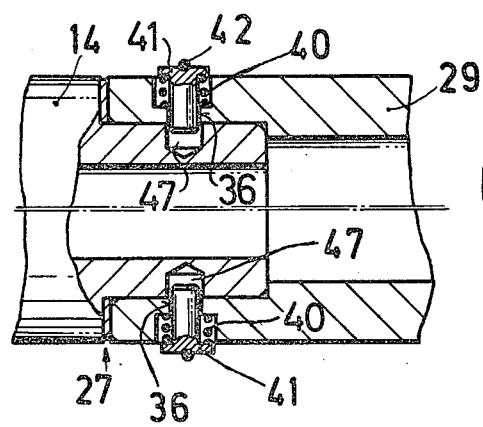
FIG. 9 is an axially extending section of another embodiment of the present invention illustrating several pins extending radially inwardly with a spring ring biasing the pins inwardly into the locking position against another spring action which biases the pins outwardly.

In FIG. 9 another embodiment is shown in which the locking action is effected by pins 41 biased by springs 40 into the unlocked position. In this arrangement, the locking action between the coaxially arranged rotating bearing ring 14 and ring 29 is achieved by installing a spring ring 42 around the outwardly projecting heads of the pins 41. The spring ring 42 pushes the pins 41 inwardly, opposite to the biasing action of the springs 40, through the bores 36 in the ring 29 into the bores 47 in the inner or rotating ring bearing 14. It would be possible to use a circumferential groove in the rotating ring bearing 14 instead of the bores 47. In this locking connection, when the spring ring 42 is removed, the pins 41 are displaced radially outwardly by the springs 40 into the unlocked position, such movement occurs automatically once the spring ring 42 is removed.

Figure 10:
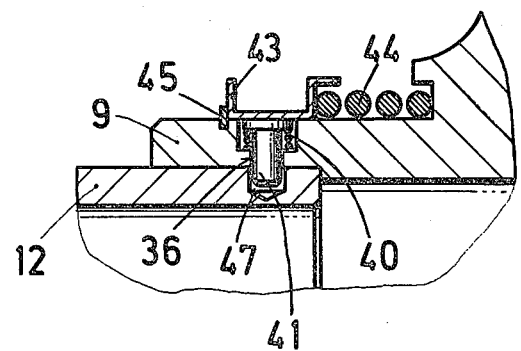
FIG. 10 is an embodiment similar to FIG. 9 with a rigid axially movable ring fixing the pins in the locking position.

In FIG. 10 a modification is shown of the device in FIG. 9 in which the pins 41 are held in the locking position against the biasing action of the springs 40, by a rigid ring 43 which is axially movable over the outside surface of the guide sleeve 9. In this embodiment the connection is provided between the guide sleeve 9 and the hydraulic cylinder 12. Normally, the rigid ring 43 is held in the locked position by a locking spring 44 which biases it over the pins 41. In the locked position, the ring 43 is pushed by the spring 44 against a stop 45. The other parts of this locking device correspond in principle to those discussed above.

Figure 11:
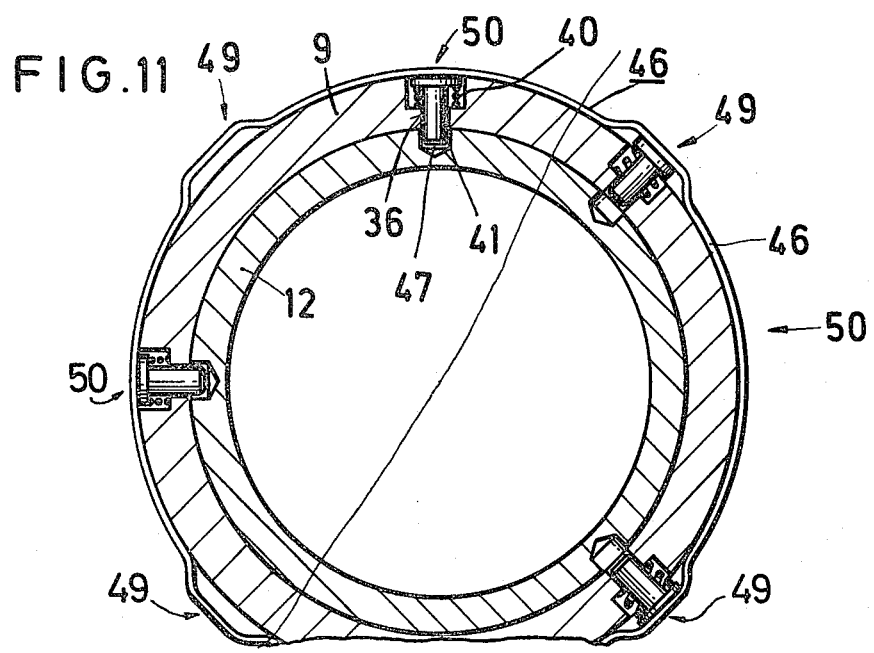
FIG. 11 is a transverse sectional view of yet another embodiment of the present invention, similar to the ones shown in FIGS. 9 and 10, with a rigid rotatable ring effecting the locking engagement of the pins.

In FIG. 11 another embodiment of a locking ring 46 is illustrated with the ring being rotatable about and coaxial with the guide sleeve 9. In FIG. 11 two different positions of the ring 46 are shown. The ring is provided with angularly spaced apart outwardly extending projections 49 which projections form inwardly facing recess with the bases of the recesses being spaced outwardly from the inside diameter of the ring which corresponds to the outside diameter of the guide sleeve 9. The portions of the ring 46 between the projections 49 have an inside diameter the same as the outside diameter of the guide sleeve 9. When the ring 46 is in the position shown in the left-hand side of FIG. 11, the portions 50 of the ring depress the pins inwardly through the bores 36 in the guide sleeve 9 into the locking position in engagement with the aligned bores 47 in the inner hydraulic cylinder 12. By rotating the ring about the axis of the guide sleeve 9, the outward projections 49 are aligned over the pins 41, as shown in the right hand side of FIG. 11, so that the biasing action of the springs 40 displace the pins 41 radially outwardly into the unlocked position.

The locking connections shown in the various embodiments afford a secure and positive connection between the disengaging mechanism, which can be supported in any manner on the gear housing, and the disengaging parts of the clutch. As compared to the present state of the art, it can be clearly appreciated that when the clamps or the pins are placed in the locking position the transmission elements are perfectly locked in their operating positions. Further, the locking connection can be released only when the locking elements are manually removed from the locked positions.

While specific embodiments of the invention have been shown and described in detail to illustrate the application of the inventive principles, it will be understood that the invention may be embodied otherwise without departing from such principles.

What is claimed is:

1. Disengaging device for a friction clutch to be attached to the motor of a vehicle, the friction clutch including a rotating member to be displaced in the axial direction along the axis of rotation of the rotating member for disengaging the clutch, a gear case, and means extending between said rotating member and said gear case for providing a connection therebetween, said means including a releasable locking connection, wherein the improvement comprising that said connection means comprises a first part coaxial with the axis of rotation of said rotating member, a second part coaxial with the axis of rotation and laterally enclosing said first part, said second part have a circumferentially extending outside surface and inside surface and said first part having a circumferentially extending outside surface, said second part having at least one opening extending therethrough from the outside surface to the inside surface thereof, a locking member removably insertable through the opening in said second part into locking engagement with said first part for locking said first and second parts against relative movement therebetween in the direction of the axis of rotation of said rotating member, said first part has a circumferentially extending groove in the outside surface thereof extending for at least a part of the circumferentially extending outside surface, said opening extends chordally of said second part so that a portion of the opening extends through the inside surface of said second part and the least dimension from the axis of said second part to the base of said opening being approximately equal to the diameter of the base of the circumferential groove in said first part so that the base of the opening in said second part extends approximately tangentially of the base of said circumferential groove, said locking member comprises a locking clamp having a pair of substantially parallel legs and a bight portion extending transversely between and interconnecting one end of each of said legs, a pair of said openings located on diametrically opposite sides of said second part, each of said legs of said locking clamp being guided through a different one of said openings in said second part and extending into the portion of said openings which open through the inside surface of said second part into the circumferential groove in said first part, wherein each of said legs at the opposite ends from the bight portion are bent inwardly toward one another forming a curved portion so that in the locked position the inwardly bent ends of said legs engage the outside surface of said second part for securing said clamp in the locked position, projections being formed on said second part and each said projection extending over and being located outwardly from one end of one of said openings through said second part, and the ends of said legs spaced from the ends connected to said bight portion being bent into a hook shape so that each hook-shaped end engages one of said projections when said clamp is displaced into the locked position for securing said clamp in the locked position.

2. Disengaging device for a friction clutch to be attached to the motor of a vehicle, the friction clutch including a rotating member to be displaced in the axial direction along the axis of rotation of the rotating member for disengaging the clutch, a gear case, and means extending between said rotating member and said gear case for providing a connection therebetween, said means including a releasable locking connection, wherein the improvement comprising that said connection means comprises a first part coaxial with the axis of rotation of said rotating member, a second part coaxial with the axis of rotation and laterally enclosing said first part, said second part having a circumferentially extending outside surface and inside surface and said first part having a circumferentially extending outside surface, said second part having at least one opening extending therethrough from the outside surface to the inside surface thereof, a locking member removably insertable through the opening in said second part into locking engagement with said first part for locking said first and second parts against relative movement therebetween in the direction of the axis of rotation of said rotating member, said first part has a circumferentially extending groove in the outside surface thereof extending for at least a part of the circumferentially extending outside surface, said opening extends chordally of said second part so that a portion of the opening extends through the inside surface of said second part and the least dimension from the axis of said second part to the base of the opening being approximately equal to the diameter of the base of the circumferential groove in said first part so that the base of the opening in said second part extends approximately tangentially of the base of said circumferential groove, said locking member comprises a locking clamp having a pair of substantially parallel legs and a bight portion extending transversely between and interconnecting one end of each of said legs, a pair of said openings located in diametrically opposite sides of said second part, each of said legs of said locking clamp being guided through a different one of said openings in said second part and extending into the portion of said openings which open through the inside surface of said second part into the circumferential groove in said first part, and said second part has a web projecting outwardly therefrom transversely of the axial direction of said second part, said outwardly projecting web being arranged to receive said bight portion of said locking clamp in the locked position.

3. Disengaging device, as set forth in claim 2, wherein said outwardly projecting web has a groove therein facing inwardly toward the outside surface of said second member and said bight portion of said clamp being engageable within said groove in the locking position for securing said clamp in the locked position.

4. Disengaging device for a friction clutch to be attached to the motor of a vehicle, the friction clutch including a rotating member to be displaced in the axial direction along the axis of rotation of the rotating member for disengaging the clutch, a gear case, and means extending between said rotating member and said gear case for providing a connection therebetween, said means including a releasable locking connection, wherein the improvement comprising that said connection means comprises a first part coaxial with the axis of rotation of said rotating member, a second part coaxial with the axis of rotation and laterally enclosing said first part, said second part having a circumferentially extending outside surface and inside surface and said first part having a circumferentially extending outside surface, said second part having at least one opening extending therethrough from the outside surface to the inside surface thereof, a locking member removably insertable through the opening in said second part into locking engagement with said first part for locking said first and second parts against relative movement therebetween in the direction of the axis of rotation of said rotating member, said locking member comprises a plurality of pins, said at least one opening comprising a plurality of bores extending radially through said second part from the outside surface to the inside surface, said bores being angularly spaced apart around the circumference of said second part, each of said pins being mounted in a different one of said bores, and a ring member encircling the outside surface of said second part in engagement with said pins for biasing said pins inwardly through said bores in said second part into locking engagement with said first part, said ring comprises a closed ring rotatably mounted on the outside surface of said second part, said ring having an inside surface in slidable contact with the outside surface of said second part and said ring having angularly spaced outwardly directed projections arranged to align with said pins extending through said bores in said second member with said projections forming outwardly extending recesses from the outside surface of said second part so that with said projections aligned opposite said pins said pins can be displaced outwardly through said bores for releasing the locked condition of said first and second parts.

5. Disengaging device, as set forth in claim 4, wherein spring means are disposed in contact with said pins for biasing said pins radially outwardly away from said first part for moving said pins into the unlocked position.

* * * * *